UNITED STATES PATENT OFFICE.

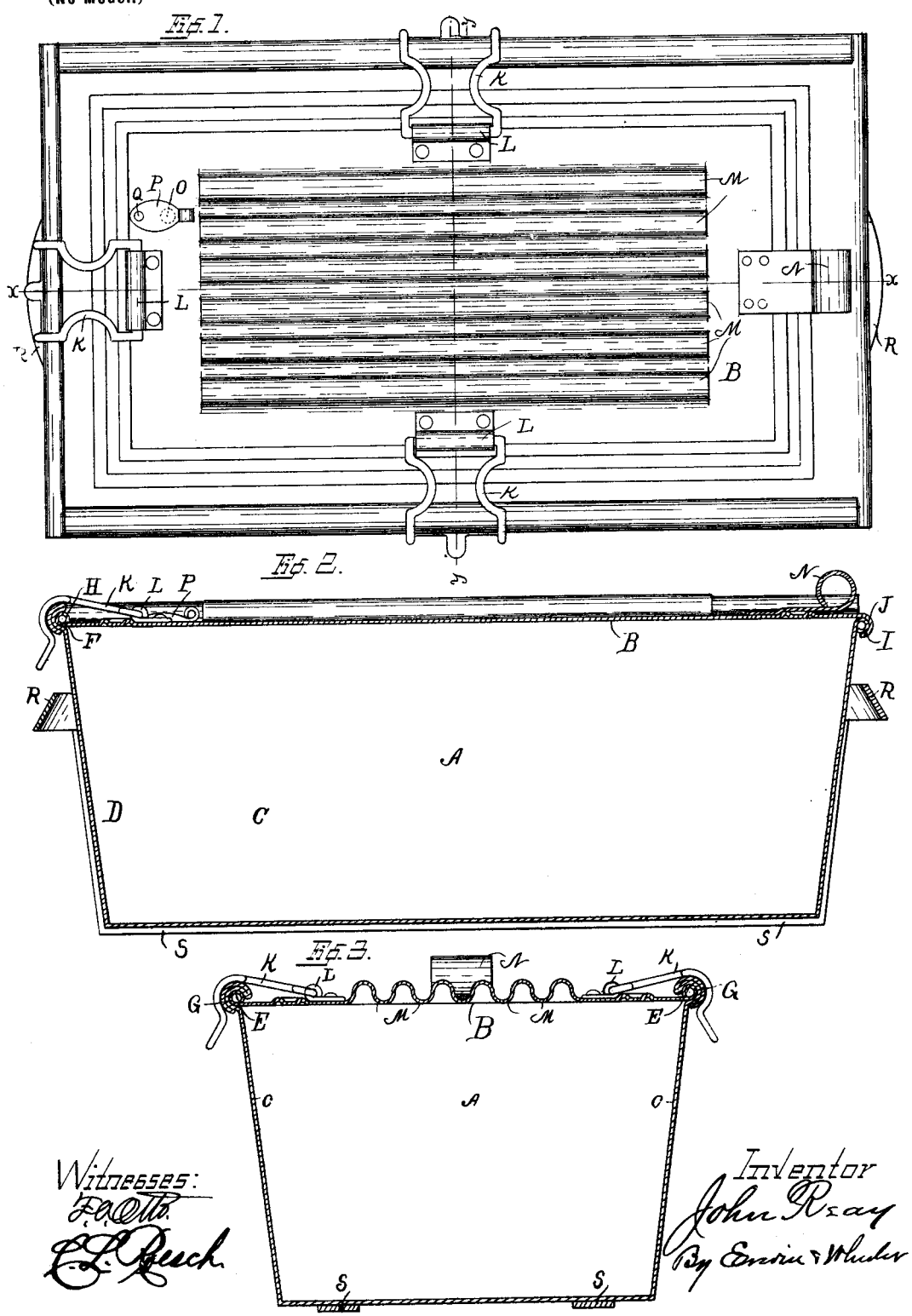

JOHN REAY, OF MILWAUKEE, WISCONSIN, ASSIGNOR OF ONE-FOURTH TO FRANK L. HAZARD, OF SAME PLACE.

RECEPTACLE FOR ROASTING OR BAKING MEATS.

SPECIFICATION forming part of Letters Patent No. 676,049, dated June 11, 1901.

Application filed June 1, 1900. Serial No. 18,702. (No model.)

*To all whom it may concern:*

Be it known that I, JOHN REAY, a citizen of the United States, residing at Milwaukee, county of Milwaukee, and State of Wisconsin, have invented new and useful Improvements in Receptacles for Roasting or Baking Meats, of which the following is a specification.

My invention relates to improvements in receptacles for roasting and baking meats.

The objects of my invention are, first, to provide a receptacle which may be more perfectly closed, so as to prevent the vaporized juices of the meat from escaping, and, second, to provide means for concentrating the condensed juices of the meat which are vaporized by the process of roasting or baking and causing them to drop back upon the meat instead of flowing down on the sides of the receptacle, whereby the meat is kept moist and more uniformly roasted without liability of becoming burned upon its outer surface and whereby the necessity of adding water or basting the roast while in the oven is avoided.

My invention pertains more especially to the tubular grooves formed on the upper edges of the respective sides and one end of the receptacle for the reception of the beaded edges of the cover, by which a close joint is formed between such parts; also, to the fastening-clasps by which the cover and receptacle are drawn more closely together, and, further, to the corrugations formed in the cover, whereby the condensed moisture from the meat will be caused to drop back upon it.

My invention is explained by reference to the accompanying drawings, in which—

Figure 1 represents a top view of the receptacle. Fig. 2 is a longitudinal section drawn on line *x x* of Fig. 1, and Fig. 3 is a transverse section drawn on line Y Y of Fig. 1.

Like parts are identified by the same reference-letters throughout the several views.

A represents the receptacle.

B is the cover. The upper edges of the side walls C C and the end wall D are curved in a circular form outwardly and upwardly and terminate inwardly and downwardly, thus forming cylindrical grooves E E and F for the reception of the beaded edges G G and H of the cover, to which they conform in shape and are adapted to closely fit. The beaded edges G G are adapted to slide into the grooves E E lengthwise from the end of the receptacle toward the right, reference being made to Figs. 1 and 2, so that when in place the end bead H will be brought into the end groove F. The end of the receptacle toward the right in Fig. 2 is provided with a cylindrical bead I, while the corresponding end of the cover is provided with a cylindrical groove J, which when the cover is in place upon the receptacle will engage the outer surface of said bead I. Thus it will be obvious that when the cover is in place a closely-fitting joint is formed between it and the entire upper edge of the receptacle. The joints thus formed between the beaded edges of the cover and the receptacle are drawn more closely together by the fastening-clasps K, which are secured to the cover by the hinged joints L. The clasps K are preferably made of elastic wire and are so shaped that they will yield when brought down in contact with the exterior surfaces of the tubular grooves E and F, whereby such grooves will be drawn inwardly and more closely against the beaded edges of the cover and are thus securely held in place, as indicated in Figs. 2 and 3, the elasticity of the clasps and the sides of the receptacle being such as to permit the clasps to spring over the convex surfaces of the tubular grooves.

M M are series of longitudinal corrugations formed in the cover, by which the condensed juices of the meat, which are vaporized by roasting, are caused to accumulate and drip back upon the meat instead of flowing downwardly along the walls of the receptacle, as they would otherwise do.

N is a handle by which the cover may be drawn from or put in place upon the receptacle A.

O is a vent-opening, which is adapted to be closed by the cover P, which cover P is secured to the cover of the receptacle by a pivotal bolt Q. The vent O is preferably closed while the meat is being roasted or baked. When, however, it is desirous to brown the surface of the meat, the cover P is opened, whereby the vaporized juices are permitted to escape until the meat is sufficiently browned.

R R are ordinary handles for the receptacle, and S S are strengthening-bands for holding the receptacle in shape.

Having thus described my invention, what I claim as new, and desire to secure by Letters Patent, is—

1. The combination of the receptacle A, provided with longitudinal cylindrical grooves E, E and transverse cylindrical groove F, formed within the vertical side walls and end wall of the receptacle with the sliding cover B provided with cylindrical bend N and cylindrical edges G, G and H, such cylindrical edges conforming in shape and adapted to fit into said cylindrical grooves, substantially as and for the purpose specified.

2. The combination of the receptacle A, provided with tubular grooves E, E and F, with the sliding cover B provided with cylindrical edges G, G and H, and fastening-clasps K, K and K, respectively hinged at their inner ends at their respective sides and one end of said cover, said two side clasps K, K being adapted to engage and draw the two sides of the receptacle toward each other and in close contact with the edges of the cover, substantially as and for the purpose specified.

In testimony whereof I affix my signature in the presence of two witnesses.

JOHN REAY.

Witnesses:
JAS. B. ERWIN,
C. L. ROESCH.